(12) United States Patent
Sarti et al.

(10) Patent No.: US 12,046,048 B2
(45) Date of Patent: Jul. 23, 2024

(54) SYSTEMS AND METHODS FOR UTILIZING MODELS TO DETECT DANGEROUS TRACKS FOR VEHICLES

(71) Applicant: Verizon Patent and Licensing Inc., Basking Ridge, NJ (US)

(72) Inventors: Leonardo Sarti, Florence (IT); Tommaso Bianconcini, Florence (IT); Leonardo Taccari, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/170,972

(22) Filed: Feb. 17, 2023

(65) Prior Publication Data

US 2023/0206652 A1    Jun. 29, 2023

Related U.S. Application Data

(63) Continuation of application No. 17/447,486, filed on Sep. 13, 2021, now Pat. No. 11,594,042.

(51) Int. Cl.
*B60W 30/09* (2012.01)
*B60W 30/095* (2012.01)
(Continued)

(52) U.S. Cl.
CPC ......... *G06V 20/58* (2022.01); *B60W 30/0953* (2013.01); *B60W 30/0956* (2013.01); *B60W 50/14* (2013.01); *G01P 15/00* (2013.01); *G06F 18/2431* (2023.01); *G06T 7/20* (2013.01); *G06V 10/225* (2022.01); *G06V 20/41* (2022.01); *G06V 20/584* (2022.01); *G08G 1/166* (2013.01); *B60W 2420/403* (2013.01); *B60W 2520/00* (2013.01);
(Continued)

(58) Field of Classification Search
CPC ...... G06V 20/58; G06V 20/584; G06V 20/41; G06V 10/225; G06F 18/2431; B60W 30/0953; B60W 30/0956; B60W 50/14; B60W 2554/404; B60W 2420/403; B60W 2520/00; B60W 10/20; B60W 60/0018; G01P 15/00; G06T 7/20; G06T 2207/10016; G06T 2207/30261; G08G 1/166

See application file for complete search history.

(56) References Cited

U.S. PATENT DOCUMENTS

2017/0200061 A1    7/2017   Julian et al.
2020/0057894 A1    2/2020   Sambo et al.
(Continued)

*Primary Examiner* — Abdul-Samad A Adediran

(57) ABSTRACT

A device may receive accelerometer data and video data for a vehicle and may identify bounding boxes and object classes for objects near the vehicle. The device may identify tracks for the objects and may filter out tracks that are not associated with vehicles or vulnerable road users to generate one or more tracks or an indication of no tracks. The device may generate a collision cone identifying a drivable area of the vehicle to identify objects more likely to be involved in a collision and may filter out tracks from the one or more tracks, based on the bounding boxes, and to generate a subset of tracks or another indication of no tracks. The device may determine scores for the subset of tracks and may identify a track of the subset of tracks with a highest score. The device may perform actions based on the identified track.

20 Claims, 10 Drawing Sheets

(51) Int. Cl.
    *B60W 50/14*      (2020.01)
    *G01P 15/00*      (2006.01)
    *G06F 18/2431*    (2023.01)
    *G06T 7/20*       (2017.01)
    *G06V 10/22*      (2022.01)
    *G06V 20/40*      (2022.01)
    *G06V 20/58*      (2022.01)
    *G08G 1/16*       (2006.01)

(52) U.S. Cl.
    CPC ............... *B60W 2554/404* (2020.02); *G06T 2207/10016* (2013.01); *G06T 2207/30261* (2013.01)

(56) References Cited

U.S. PATENT DOCUMENTS

2021/0354729 A1* 11/2021 Ng .................... B60W 60/0018
2022/0363247 A1* 11/2022 Hendy ................. B60W 10/20

\* cited by examiner

SYSTEMS AND METHODS FOR UTILIZING MODELS TO DETECT DANGEROUS TRACKS FOR VEHICLES

RELATED APPLICATION

This application is a continuation of U.S. patent application Ser. No. 17/447,486, entitled "SYSTEMS AND METHODS FOR UTILIZING MODELS TO DETECT DANGEROUS TRACKS FOR VEHICLES," filed Sep. 13, 2021 (now U.S. Pat. No. 11,594,042), which is incorporated herein by reference in its entirety.

BACKGROUND

A fleet management system may utilize video analytics software that automatically analyzes road scene videos provided by vehicle devices (e.g., dash cameras) installed inside vehicles.

DETAILED DESCRIPTION OF EXAMPLE EMBODIMENTS

Figure 1A:
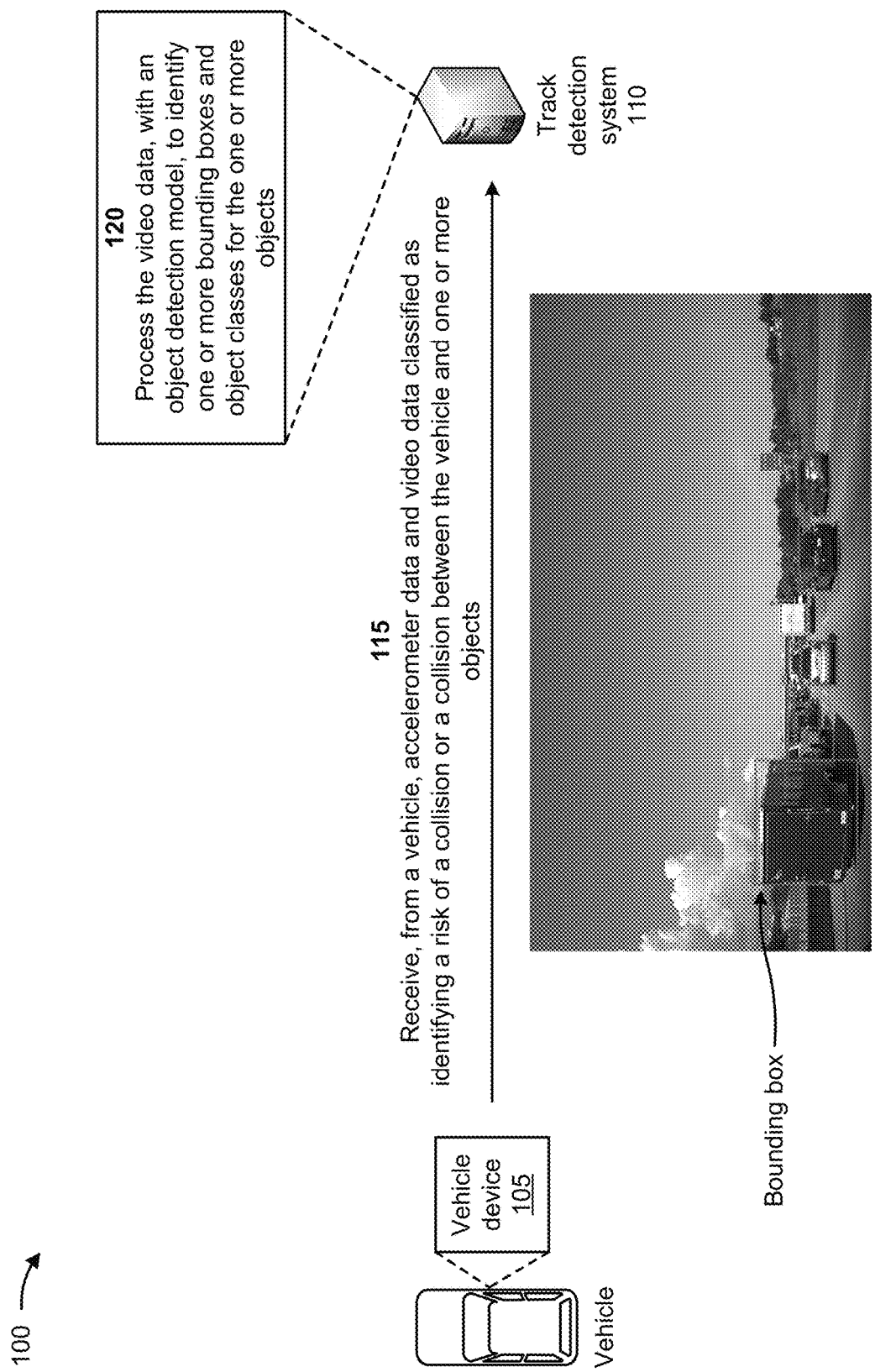
FIGS. 1A-1F are diagrams of an example associated with utilizing models to detect dangerous tracks for vehicles.

The following detailed description of example implementations refers to the accompanying drawings. The same reference numbers in different drawings may identify the same or similar elements.

Video analytics software may be triggered every time a harsh driving event is detected by an accelerometer sensor within a vehicle. For example, if a possible harsh driving event is detected in accelerometer data, the video analytics software may further analyze the event to determine whether the event is associated with a real danger. The video analytics software may classify a harsh driving event into one of multiple categories of severity, based on a road scene video and related telematics data (e.g., accelerometer data, gyroscope data, location data, and/or the like). The categories of severity may include a low-risk category (indicating no danger in the road scene), a harsh driving category (indicating a harsh maneuver but no risk of collision with other objects), a dangerous category (indicating a risk of collision with other objects), a collision category (indicating a collision), and/or the like. However, current video analytics software is unable to identify an object that causes a collision or a risk of collision when the dangerous category or the collision category is identified.

Thus, current video analytics software consumes computing resources (e.g., processing resources, memory resources, communication resources, and/or the like), networking resources, transportation resources, and/or other resources associated with erroneously identifying a risk of collision or a collision, unnecessarily dispatching emergency personnel based on the erroneously identified risk of collision or collision, determining fault for a collision, handling lawsuits associated with a collision but without information identifying the object that caused the collision, and/or the like.

Some implementations described herein provide a track detection system that utilizes models to detect dangerous tracks for vehicles. For example, the track detection system may receive, from a vehicle, accelerometer data and video data classified as identifying a risk of a collision or a collision between the vehicle and one or more objects, and may process the video data to identify one or more bounding boxes and object classes for the one or more objects. The track detection system may process the video data to identify tracks for the one or more objects, and may utilize, based on the object classes, the tracking model to filter out tracks that are not associated with vehicles or vulnerable road users and to generate one or more tracks or an indication of no tracks. The track detection system may generate, based on the one or more tracks, a collision cone identifying a drivable area of the vehicle to identify objects more likely to be involved in the collision, and may filter out tracks from the one or more tracks, based on areas and aspect ratios of the one or more bounding boxes, to generate a subset of tracks or another indication of no tracks. The track detection system may determine, based on the subset of tracks, the one or more bounding boxes, the collision cone, and the accelerometer data, scores for the subset of tracks, and may identify a track of the subset of tracks with a highest score. The track detection system may perform one or more actions based on the identified track with the highest score.

In this way, the track detection system utilizes models to detect dangerous tracks for vehicles. For example, when a dangerous event or a collision occurs, the track detection system may identify an object that caused the dangerous event or the collision. The track detection system may utilize an object detection model and a tracking model to identify position coordinates and sizes of every object in a scene at every frame of a video. Based on the video, the track detection system may determine a trajectory of each object, where each object travels, and how fast each object moves. Each object detected across the video may be referred to herein as a track. The track detection system may identify a track responsible for a dangerous event or a collision based on the tracks identified in the video. Thus, implementations described herein may conserve computing resources, networking resources, transportation resources, and other resources that would have otherwise been consumed by erroneously identifying a risk of collision or a collision, unnecessarily dispatching emergency personnel based on the erroneously identified risk of collision or collision, determining fault for a collision, handling lawsuits associated with a collision but without information identifying the object that caused the collision, and/or the like.

FIGS. 1A-1F are diagrams of an example 100 associated with utilizing models to detect dangerous tracks for vehicles. As shown in FIGS. 1A-1F, example 100 includes a vehicle device 105 (associated with a vehicle) and a track detection system 110. Further details of the vehicle devices 105 and the track detection system 110 are provided elsewhere herein.

As shown in FIG. 1A, and by reference number 115, the track detection system 110 may receive, from the vehicle or the vehicle device 105, accelerometer data and video data classified as identifying a risk of a collision or a collision between the vehicle and one or more objects. In some implementations, the accelerometer data and the video data may be received when a particular harsh driving event is detected by video analytics software of the vehicle device 105. The particular harsh driving event may include an event categorized in the dangerous category (indicating a risk of collision with other objects) or the collision category (indicating a collision).

The accelerometer data may include accelerometer data taken along a direction of travel (e.g., an x-axis) of the vehicle. The accelerometer includes accelerometer data taken along the x-axis because the x-axis includes data associated with hard braking of the vehicle. The video data may include video captured by the vehicle device during a time period that includes the risk of the collision or during the collision between the vehicle and the one or more objects.

As further shown in FIG. 1A, and by reference number 120, the track detection system 110 may process the video data, with a model (e.g., an object detection model), to identify one or more bounding boxes and object classes for the one or more objects. In some implementations, the object detection model includes a you-only-look-once, version 3 (YOLOv3) model. YOLOv3 is a real-time object detection model that identifies specific objects in videos, live feeds, and/or images. YOLOv3 utilizes features learned by a deep convolutional neural network model to detect an object. The object detection model may determine position coordinates (e.g., a bounding box) and a size of every object in a scene of every frame of the video data. The object detection model may analyze the video data to determine a trajectory of each object, where each object travels, how fast each object moves, and/or the like. A track is a set of bounding boxes for every frame that contains a specific object.

For every frame of the video data, the object detection model may output coordinates of a bounding box for each object detected by the object detection model, and an object class (e.g., a car, a truck, a bus, a bike, a motorbike, a person, and/or the like) for each object. Once the track detection system 110 determines the bounding boxes for all objects detected in every frame of the video data, the track detection system 110 may determine a link between the objects across multiple frames. The track detection system 110 may output a track for every object in the video data.

Figure 1B:
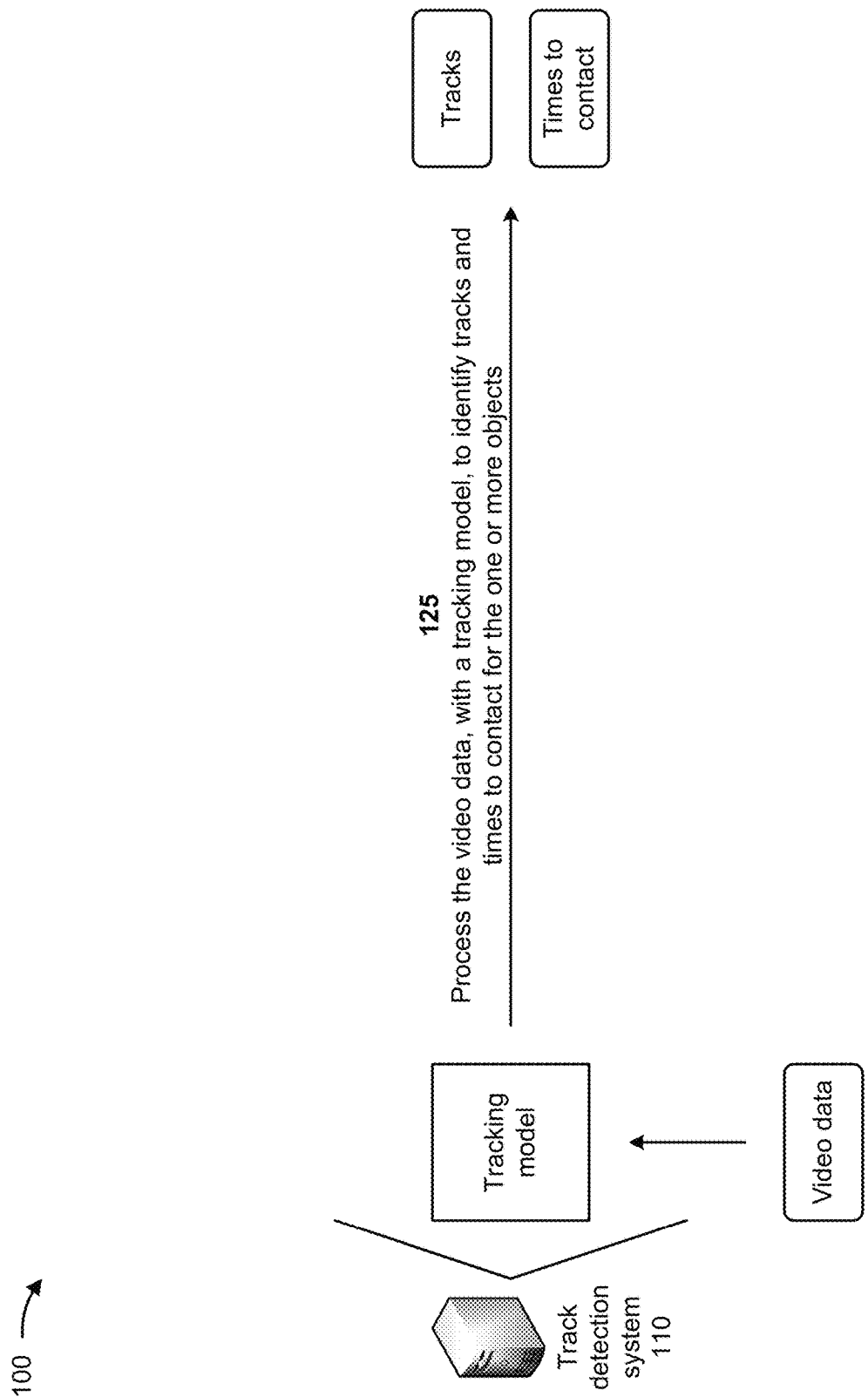

As shown in FIG. 1B, and by reference number 125, the track detection system 110 may process the video data, with a tracking model, to identify times to contact and tracks for the one or more objects. In some implementations, the tracking model may determine other data associated with the bounding boxes identified by the objection detection model. The tracking model may determine a time to contact for each bounding box associated with each object. The time to contact may include a time period (e.g., in seconds) for each object to collide with the vehicle if a current movement speed of each object is utilized to project a position of each object at a future time. In some implementations, when processing the video data, with the tracking model, to identify the tracks for the one or more objects, the tracking model may determine sets of bounding boxes for each frame of the video data that includes the one or more objects and may identify the tracks for the one or more objects based on the sets of bounding boxes.

Figure 1C:
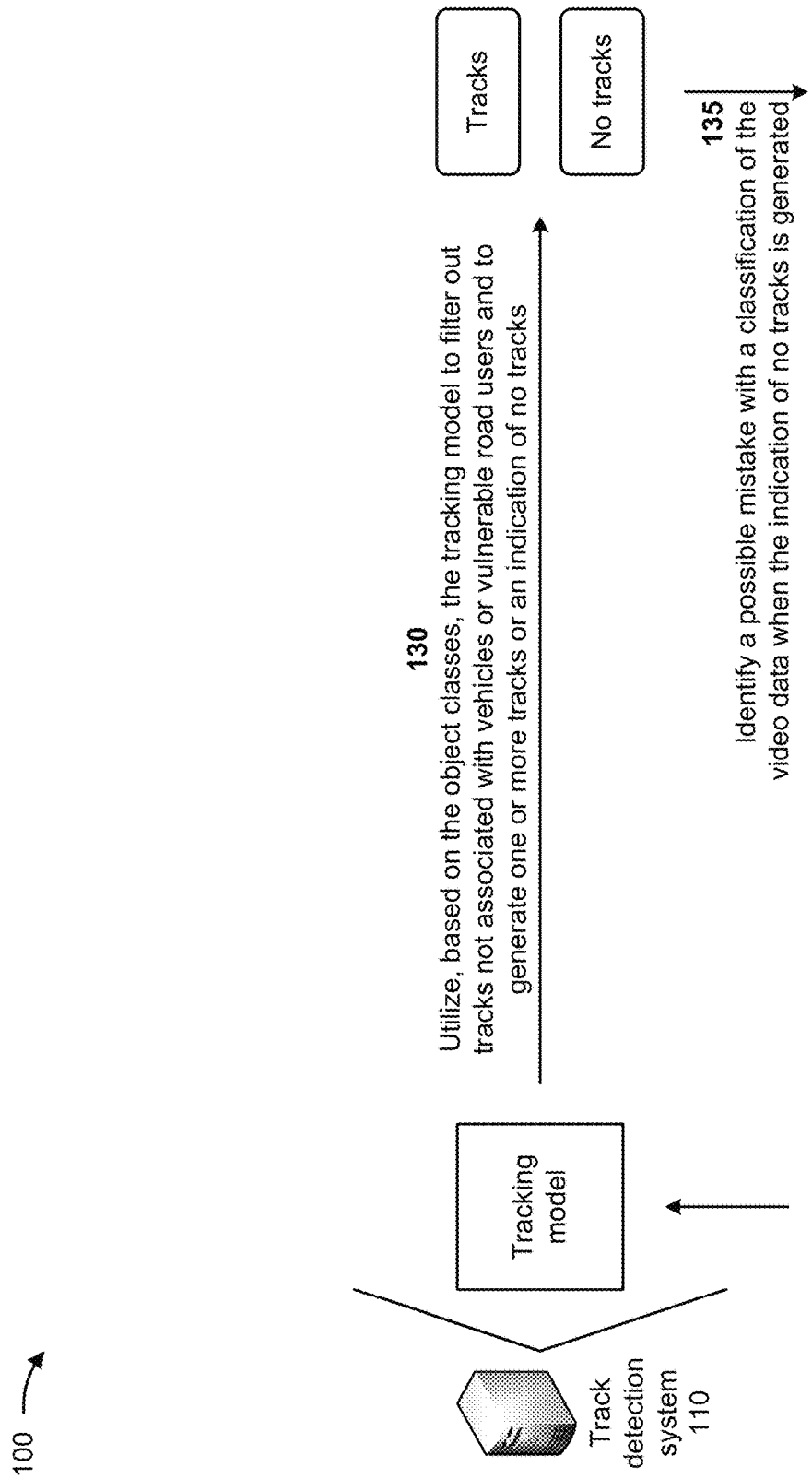

As shown in FIG. 1C, and by reference number 130, the track detection system 110 may utilize, based on the object classes, the tracking model to filter out tracks not associated with vehicles or vulnerable road users and to generate one or more tracks or an indication of no tracks. In some implementations, when utilizing, based on the object classes, the tracking model to filter out tracks that are not associated with vehicles or vulnerable road users and to generate the one or more tracks or the indication of no tracks, the track detection system 110 may filter out, based on the object classes, a portion of the tracks to generate the one or more tracks from a remaining portion of the tracks. Alternatively, the track detection system 110 may filter out, based on the object classes, all of the tracks to generate the indication of no tracks. For example, the track detection system 110 may utilize the tracking model to filter out tracks for objects based the object classes associated with the objects. If an object is a vulnerable road user, the tracking model may filter out all tracks not associated with a person, a bike, or a motorbike. If an object is a vehicle, the tracking model may filter out all tracks not associated with a car, a truck, or a bus.

As further shown in FIG. 1C, and by reference number 135, the track detection system 110 may identify a possible mistake with the video data classification when no tracks remain. For example, the track detection system 110 may identify a possible mistake with the video analytics software of the vehicle device 105 when all tracks are filtered out and no tracks remain. This may provide an indication that the video analytics software incorrectly detected the particular harsh driving event, such as an event categorized in the dangerous category (indicating a risk of collision with other objects) or the collision category (indicating a collision). In some implementations, the track detection system 110 may provide, to the vehicle device 105, a notification identifying the possible mistake with the video data classification when no tracks remain. The vehicle device 105 may utilize the notification to modify the video analytics software to avoid future misclassifications of the video data.

Figure 1D:
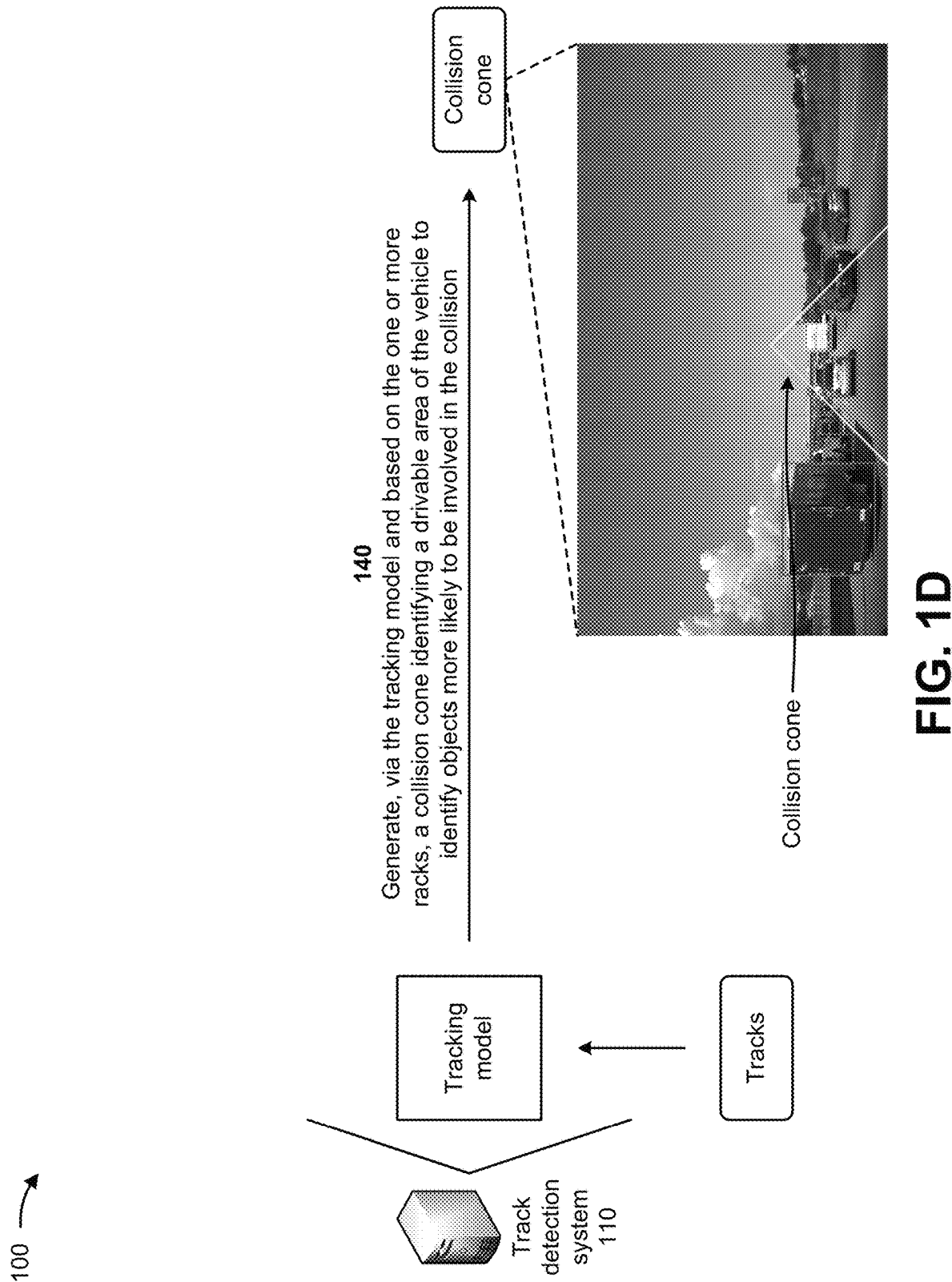

As shown in FIG. 1D, and by reference number 140, the track detection system 110 may generate, via the tracking model and based on the one or more tracks, a collision cone identifying a drivable area of the vehicle to identify objects more likely to be involved in a collision with the vehicle. An example collision cone is provided in the image depicted in FIG. 1D. The collision cone may include an area of interest that represents a drivable area ahead of the vehicle. Objects (e.g., vehicles and/or vulnerable road users) located within the collision cone may be more likely to be involved in a possible collision with the vehicle than other objects located outside of the collision cone. Given a point for the vehicle and an object both moving at constant velocities, the collision cone may include a set of angles or directions that will result in a collision if the vehicle chooses one of the angles or directions. In most cases, the collision cone may include a single range of angles and may be visualized in a workspace or a configuration space to resemble a cone. A vertex of the cone is located at the vehicle's position and may not diverge exactly in the direction of the object, but may diverge in a direction to a path that the object is following.

Figure 1E:
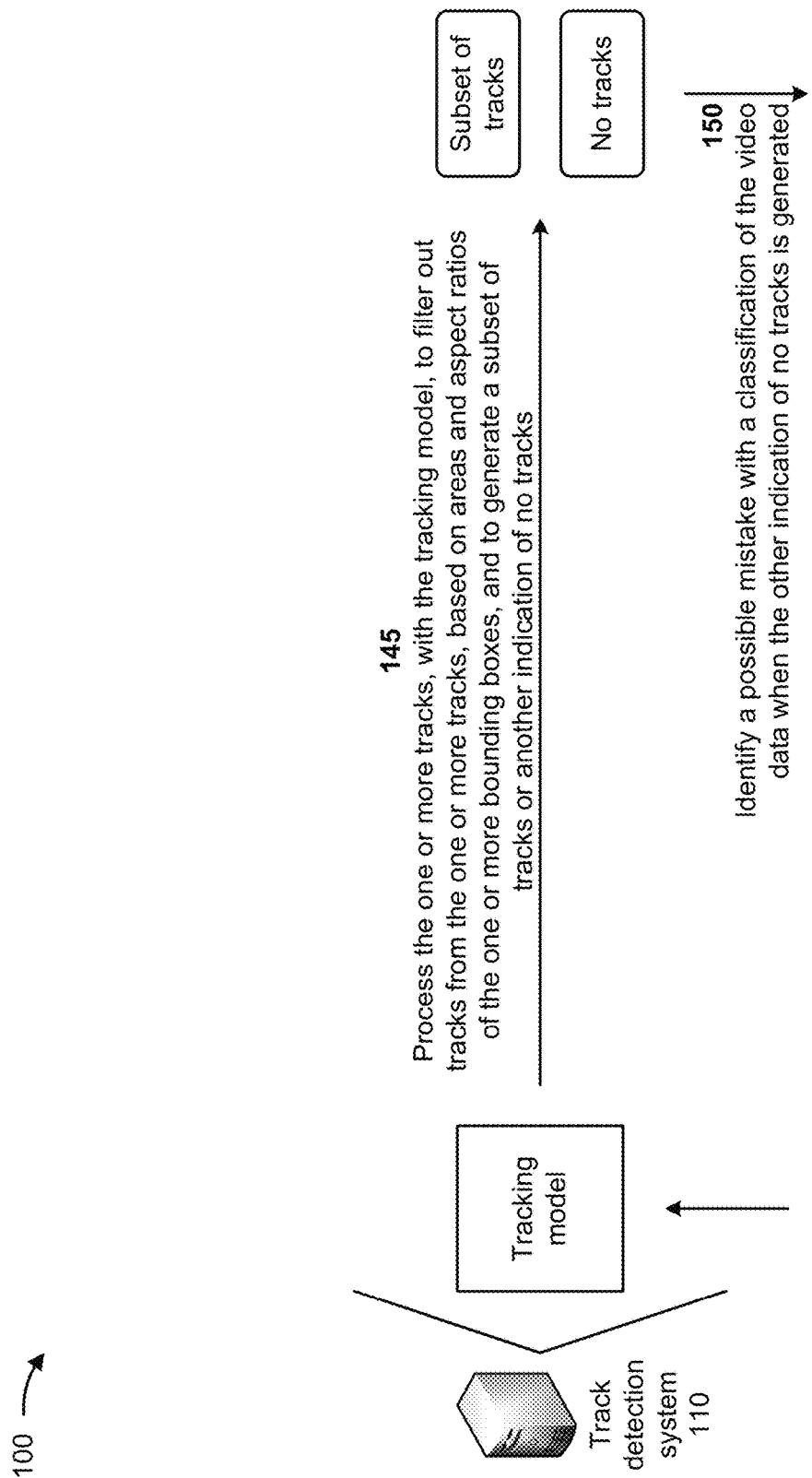

As shown in FIG. 1E, and by reference number 145, the track detection system 110 may process the one or more tracks, with the tracking model, to filter out tracks from the one or more tracks, based on areas and aspect ratios of the one or more bounding boxes, and to generate a subset of tracks or no tracks. In some implementations, when processing the one or more tracks, with the tracking model, to filter out tracks from the one or more tracks, based on the areas and the aspect ratios of the one or more bounding boxes, and to generate the subset of tracks or the other indication of no tracks, the track detection system 110 may filter out, based on the areas and the aspect ratios of the one or more bounding boxes, a portion of the one or more tracks to generate the subset of tracks from a remaining portion of the one or more tracks. Alternatively, the track detection system 110 may filter out, based on the areas and the aspect ratios of the one or more bounding boxes, all of the one or more tracks to generate the other indication of no tracks.

In some implementations, when processing the one or more tracks, with the tracking model, to filter out tracks from the one or more tracks, based on the areas and the aspect ratios of the one or more bounding boxes, and to generate the subset of tracks or the other indication of no tracks, the track detection system 110 may filter out, from the one or more tracks, tracks associated with bounding box areas less than a first percentage of frame areas. For example, the track detection system 110 may filter out tracks associated with bounding box areas less than 0.5% (e.g., between 0.25% and 0.75%) of the frame areas. This filtering may remove small bounding boxes (e.g., objects located far away from the vehicle).

Alternatively, or additionally, the track detection system 110 may filter out, from the one or more tracks, tracks associated with bounding box areas greater than a second percentage of frame areas. For example, the track detection system 110 may filter out tracks associated with medians of bounding box areas greater than 70% (e.g., between 60% and 80%) of the frame areas. This filtering may remove detections of the vehicle as one or more objects.

Alternatively, or additionally, the track detection system 110 may filter out, from the one or more tracks, tracks associated with medians of bounding box areas greater than a third percentage of frame areas and with medians of bounding box aspect ratios greater than a particular value. For example, the track detection system 110 may filter out tracks associated with medians of bounding box areas greater than 15% (e.g., between 5% and 25%) of the frame areas and medians of aspect ratios of the bounding box areas greater than two. This filtering may remove detections of the vehicle as objects, such as detections of the vehicle hood.

In some implementations, when processing the one or more tracks, with the tracking model, to filter out tracks from the one or more tracks, based on the areas and the aspect ratios of the one or more bounding boxes, and to generate the subset of tracks or the other indication of no tracks, the track detection system 110 may filter out, from the one or more tracks, tracks associated with bounding boxes that fail to intersect with the collision cone. This filtering may prevent the track detection system 110 from identifying one or more objects on adjacent lanes as dangerous. Alternatively, the track detection system may filter out, from the one or more tracks, tracks associated with bounding box areas less than a percentage of frame areas. This filtering may prevent the track detection system 110 from utilizing high time to contact values due to noise in detection of small bounding boxes.

As further shown in FIG. 1E, and by reference number 150, the track detection system 110 may identify a possible mistake with the video data classification when no tracks remain. For example, the track detection system 110 may identify a possible mistake with the video analytics software of the vehicle device 105 when all tracks are filtered out and no tracks remain. This may provide an indication that the video analytics software incorrectly detected the particular harsh driving event, such as an event categorized in the dangerous category (indicating a risk of collision with other objects) or the collision category (indicating a collision). In some implementations, the track detection system 110 may provide, to the vehicle device 105, a notification identifying the possible mistake with the video data classification when no tracks remain. The vehicle device 105 may utilize the notification to modify the video analytics software to avoid future misclassifications of the video data.

Figure 1F:
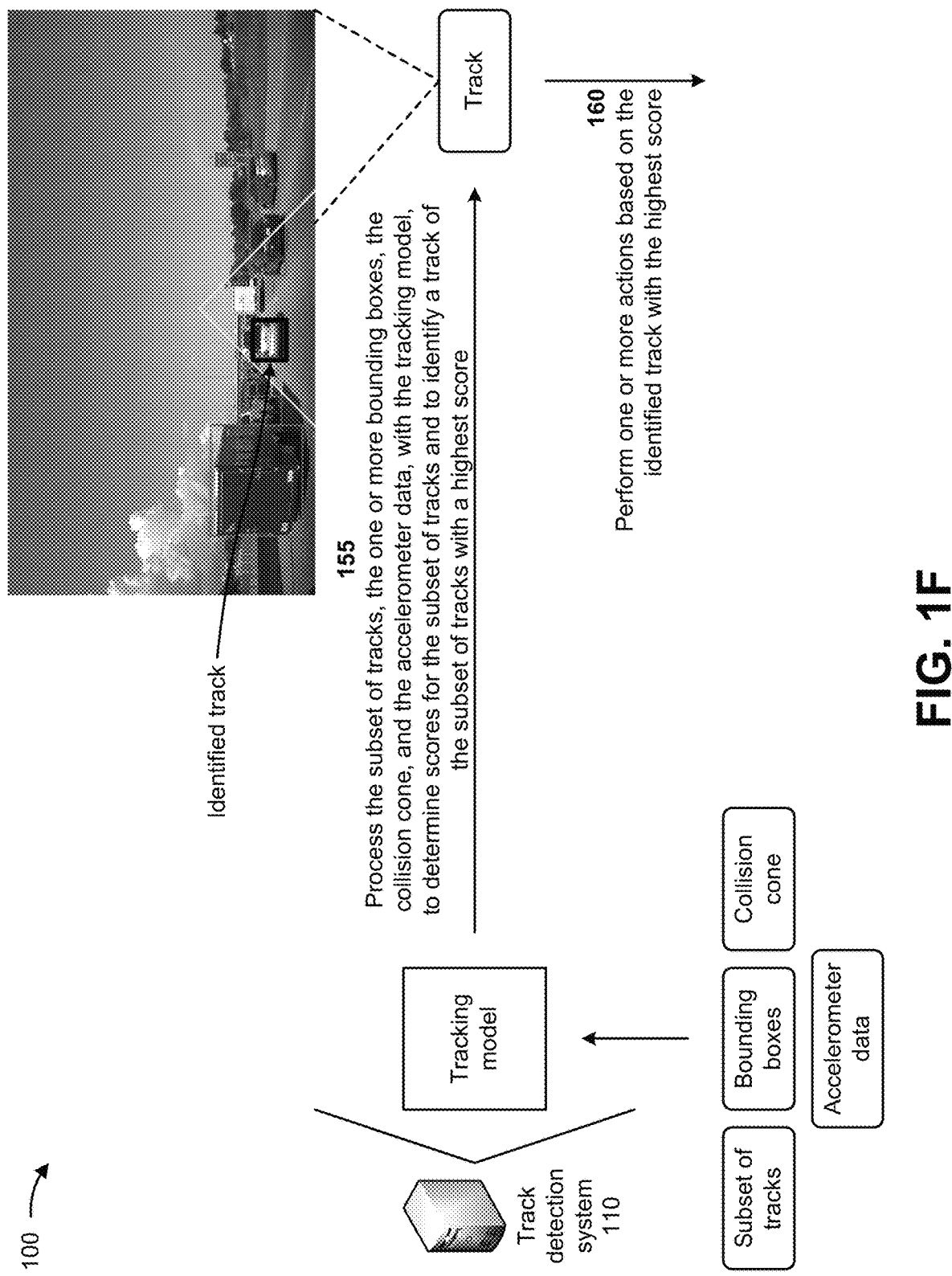

As shown in FIG. 1F, and by reference number 155, the track detection system 110 may process the subset of tracks, the one or more bounding boxes, the collision cone, and the accelerometer data, with the tracking model, to determine scores for the subset of tracks and to identify a track of the subset of tracks with a highest score. In some implementations, when processing the subset of tracks, the one or more bounding boxes, the collision cone, and the accelerometer data, with the tracking model, to determine the scores for the subset of tracks, the track detection system 110 may calculate a first score for each track of the subset of tracks based on a first time to contact associated with each track, a first border distance from a bounding box of each track to a border of a video frame, and a first center distance from a center of the bounding box of each track and a center of the video frame. The track detection system 110 may calculate a second score for each track of the subset of tracks based on a second time to contact associated with each track, a second border distance from the bounding box of each track to the border of the video frame, and a second center distance from the center of the bounding box of each track and the center of the video frame. The track detection system 110 may calculate a third score based on a time that the bounding box for each track is located in the collision cone and a time that the bounding box for each track is present in the video data.

The track detection system 110 may calculate a score for each track based on the first score, the second score, and the third score. In some implementations, the track detection system 110 calculates the score for each track based on adding the first score, the second score, and the third score. In some implementations, the track detection system 110 calculates the score for each track by applying weights to the first score, the second score, and the third score to generate a weighted first score, a weighted second score, and a weighted third score and by adding the weighted first score, the weighted second score, and the weighted third score to calculate the score for each track.

In one example, the score for each track may be calculated according to the following equation:

$$\text{Score} = \text{TrackScore}_{accel} + \text{TrackScore}_{full} + \text{TimeBasedScore}$$

where:

$$\text{TimeBasedScore} = 0.0001 + \text{time\_inside\_collision\_cone} * \text{time\_of\_existence}$$

$$\text{TrackScore} = 1/\text{low\_05\_ttc} * \text{box\_dist\_from\_bottom} * (1 - \text{dist\_from\_center\_x})$$

The subscripts full and accel for TrackScore may indicate whether the score is computed on a full track or at a specific time interval (e.g., between −0.5 seconds and +2 seconds) around an accelerometer event (e.g., which may be a peak of the accelerometer data along the x-axis). The time_inside_collision_cone may represent a time during which bounding boxes have at least one vertex inside the collision cone and may be normalized based on a length of the video. The time_of_existence may represent a time duration of a bounding box presence in the video and may be normalized based on the length of the video. The low_05_ttc may represent fifth percentile of a time to contact over the track. The box_dist_from_bottom may represent a distance of a bounding box from a bottom border of the video and may be normalized based on a height of the video. The dist_from_center_x may represent a distance between a bounding box center and a center of the video along the x-axis, and may be normalized based on a width of the video. The constant 0.0001 may be utilized to prevent bounding boxes that fail to include at least a frame with a vertex inside the collision cone from having a score of zero (e.g., to prevent excluding such bounding boxes a priori).

As shown in FIG. 1F, and by reference number 155, the track detection system 110 may perform one or more actions based on the identified track with the highest score. In some implementations, the one or more actions include the track detection system 110 providing, for display, data identifying the identified track with the highest score. For example, the track detection system 110 may provide the data identifying the identified track for display to the vehicle device 105 so that a driver of the vehicle may identify the object that caused the dangerous condition and/or the collision. In this way, the track detection system 110 may conserve computing resources, networking resources, transportation resources, and other resources that would have otherwise been consumed by determining fault for a collision, handling lawsuits associated with a collision but without information identifying the object that caused the collision, and/or the like.

In some implementations, the one or more actions include the track detection system 110 causing a classifier model that classified the video data as identifying the risk of the collision or the collision to be modified based on the identified track with the highest score. For example, the track detection system 110 may cause the video analytics software of the vehicle device 105 to modify a classifier model that classified the video data as identifying the risk of the collision or the collision. This may prevent the classifier model from generating future misclassifications of the video data. In this way, the track detection system 110 may conserve computing resources, networking resources, transportation resources, and other resources that would have otherwise been consumed by erroneously identifying a risk of collision or a collision, unnecessarily dispatching emergency personnel based on the erroneously identified risk of collision or collision, and/or the like.

In some implementations, the one or more actions include the track detection system 110 providing, to an emergency service, data identifying one of the one or more objects associated with the identified track with the highest score. For example, the track detection system 110 may provide, to a law enforcement agency, the data identifying the one of the one or more objects associated with the identified track with the highest score. The law enforcement agency may utilize the data to determine fault for the dangerous condition or the collision so that a driver or a vulnerable road user may be charged with traffic violations. In this way, the track detection system 110 may conserve computing resources, networking resources, transportation resources, and other resources that would have otherwise been consumed by erroneously identifying a risk of collision or a collision, determining fault for a collision, handling lawsuits associated with a collision but without information identifying the object that caused the collision, and/or the like.

In some implementations, the one or more actions include the track detection system 110 providing, to an insurance service, data identifying one of the one or more objects associated with the identified track with the highest score. For example, the track detection system 110 may provide, to the insurance service, the data identifying the one of the one or more objects associated with the identified track with the highest score. The insurance service may utilize the data to determine fault for the dangerous condition or the collision so that a driver or a vulnerable road user may be determined to be at fault. In this way, the track detection system 110 may conserve computing resources, networking resources, transportation resources, and other resources that would have otherwise been consumed by erroneously identifying a risk of collision or a collision, determining fault for a collision, handling lawsuits associated with a collision but without information identifying the object that caused the collision, and/or the like.

In some implementations, the one or more actions include the track detection system 110 retraining one or more of the object detection model or the tracking model based on the identified track with the highest score. The track detection system 110 may utilize the identified track with the highest score as additional training data for retraining the one or more of the object detection model or the tracking model, thereby increasing the quantity of training data available for training the one or more of the object detection model or the tracking model. Accordingly, the track detection system 110 may conserve computing resources associated with identifying, obtaining, and/or generating historical data for training the one or more of the object detection model or the tracking model relative to other systems for identifying, obtaining, and/or generating historical data for training machine learning models.

In this way, the track detection system 110 utilizes models to detect dangerous tracks for vehicles. For example, when a dangerous event or a collision occurs, the track detection system 110 may identify an object that caused the dangerous event or the collision. The track detection system 110 may utilize an object detection model and a tracking model to identify position coordinates and sizes of every object in a scene at every frame of a video. Based on the video, the track detection system 110 may determine a track of each object (e.g., a trajectory of each object, where each object travels, and how fast each object moves). The track detection system 110 may identify a track responsible for a dangerous event or a collision based on the tracks identified in the video. Thus, implementations described herein may conserve computing resources, networking resources, transportation resources, and other resources that would have otherwise been consumed by erroneously identifying a risk of collision or a collision, unnecessarily dispatching emergency personnel based on the erroneously identified risk of collision or collision, determining fault for a collision, handling lawsuits associated with a collision but without information identifying the object that caused the collision, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
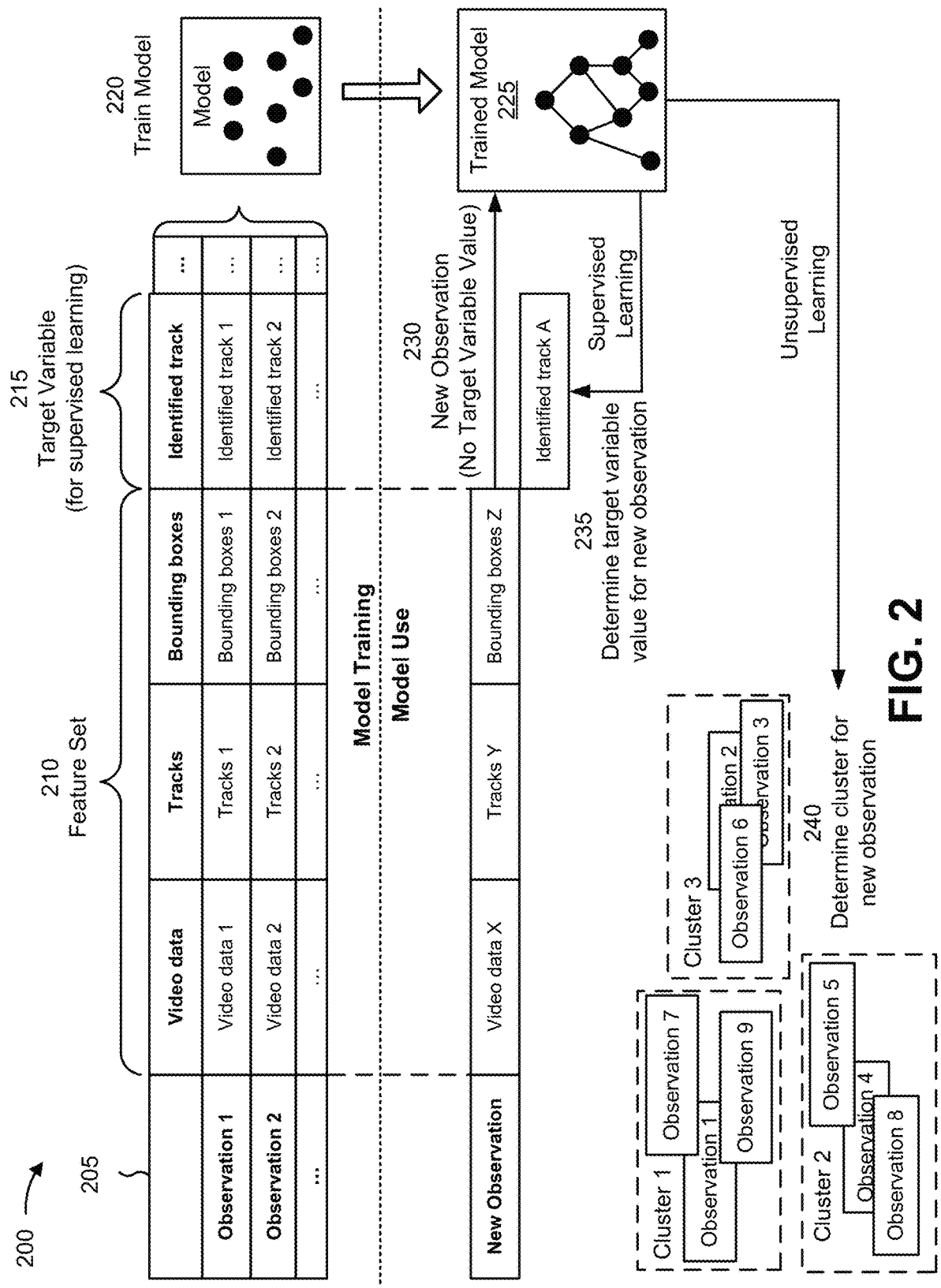
FIG. 2 is a diagram illustrating an example of training and using a machine learning model in connection with detecting dangerous tracks for vehicles.

FIG. 2 is a diagram illustrating an example 200 of training and using a machine learning model in connection with detecting dangerous tracks for vehicles. The machine learning model training and usage described herein may be performed using a machine learning system. The machine learning system may include or may be included in a computing device, a server, a cloud computing environment, and/or the like, such as the track detection system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the track detection system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the track detection system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of video data, a second feature of tracks, a third feature of bounding boxes, and so on. As shown, for a first observation, the first feature may have a value of video data 1, the second feature may have a value of tracks 1, the third feature may have a value of bounding boxes 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is an identified track, which has a value of identified track 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of tracks Y, a third feature of bounding boxes Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of identified track A for the target variable of the identified track for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a tracks cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect dangerous tracks for vehicles. The machine learning system enables recognition and/or identification of tens, hundreds, thousands, or millions of features and/or feature values for tens, hundreds, thousands, or millions of observations, thereby increasing accuracy and consistency and reducing delay associated with detecting dangerous tracks for vehicles relative to requiring computing resources to be allocated for tens, hundreds, or thousands of operators to manually detecting dangerous tracks for vehicles.

As indicated above, FIG. 2 is provided as an example. Other examples may differ from what is described in connection with FIG. 2.

Figure 3:
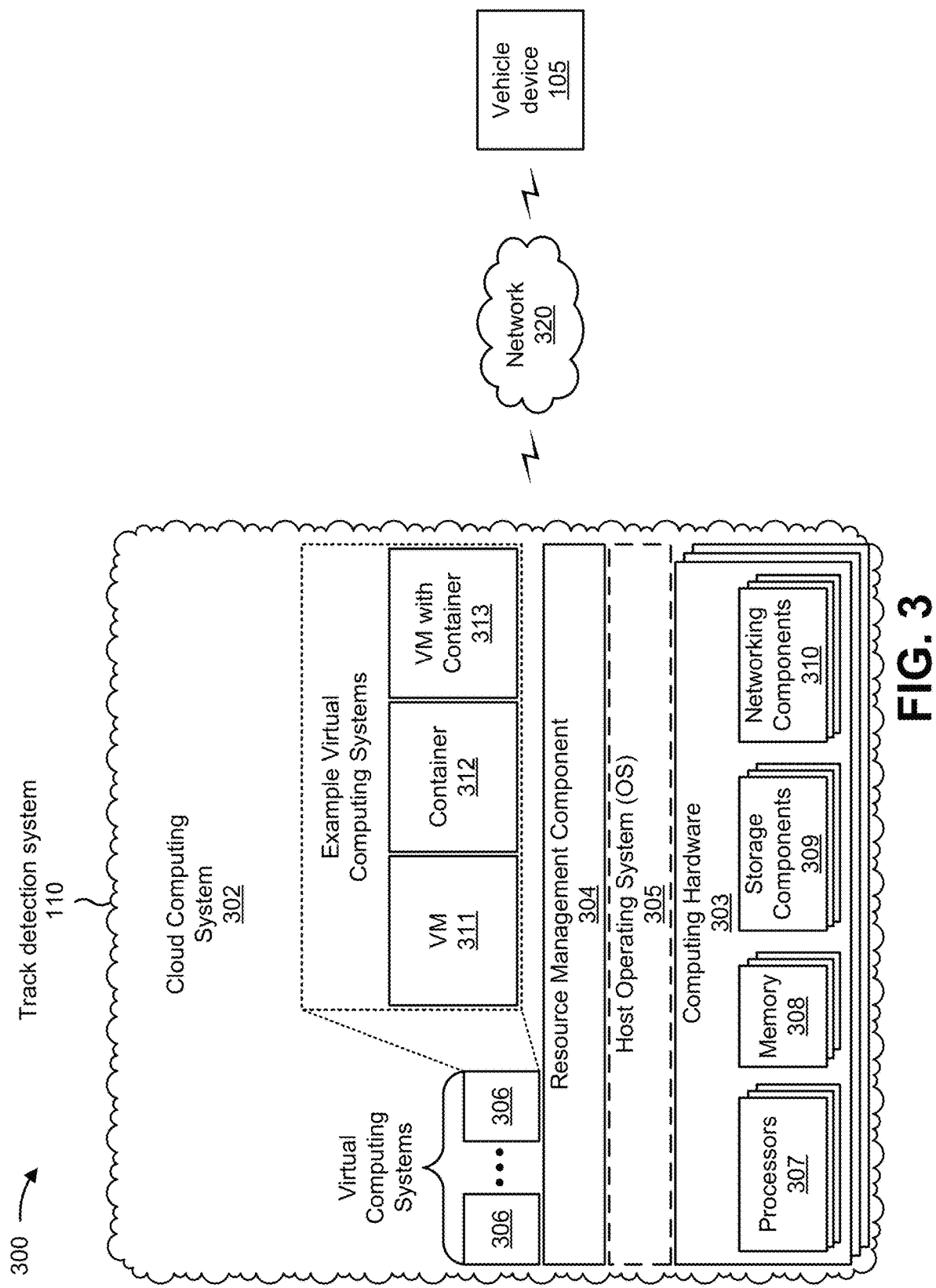
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the track detection system 110, which may include one or more elements of and/or may execute within a cloud computing system 302. The cloud computing system 302 may include one or more elements 303-313, as described in more detail below. As further shown in FIG. 3, environment 300 may include the vehicle device 105 and/or a network 320. Devices and/or elements of environment 300 may interconnect via wired connections and/or wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), an in-vehicle infotainment system, a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), among other examples.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the track detection system 110 may include one or more elements 303-313 of the cloud computing system 302, may execute within the cloud computing system 302, and/or may be hosted within the cloud computing system 302, in some implementations, the track detection system 110 may not be cloud-based (e.g., may be implemented outside of a cloud computing system) or may be partially cloud-based. For example, the track detection system 110 may include one or more devices that are not part of the cloud computing system 302, such as the device 400 of FIG. 4, which may include a standalone server or another type of computing device. The track detection system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
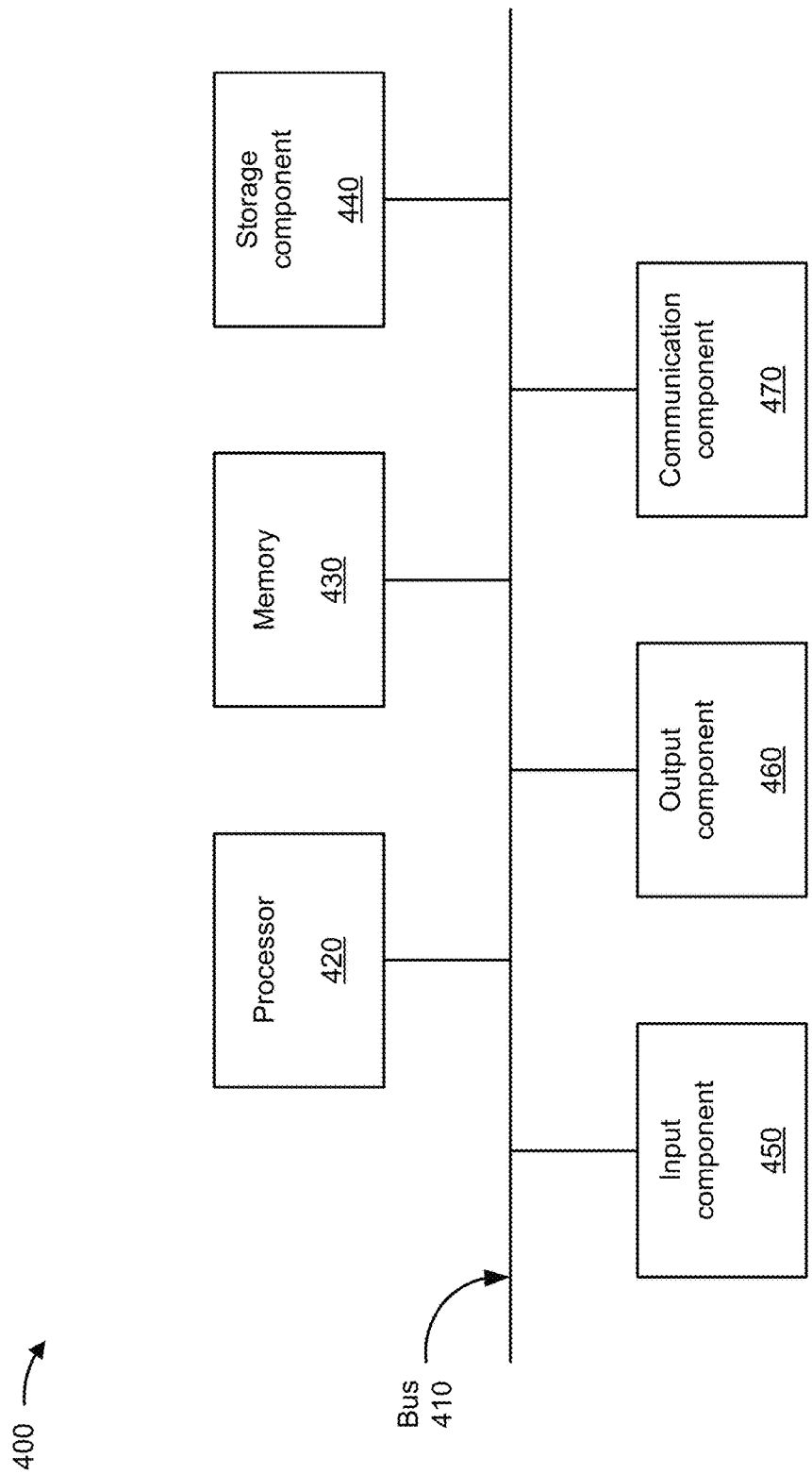
FIG. 4 is a diagram of example components of one or more devices of FIG. 3.

FIG. 4 is a diagram of example components of a device 400, which may correspond to the vehicle device 105 and/or the track detection system 110. In some implementations, the vehicle device 105 and/or the track detection system 110 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of the device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of the device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
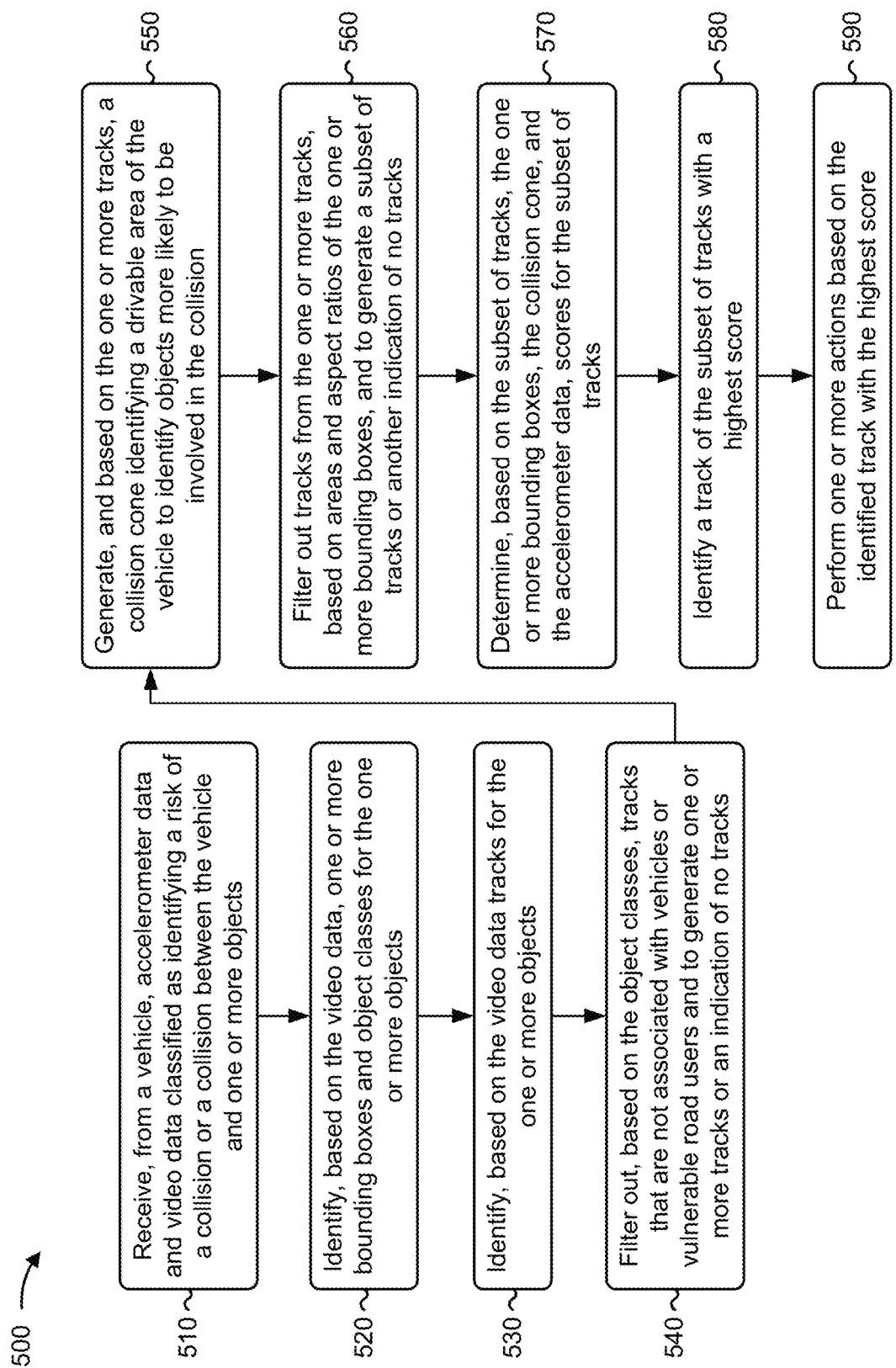
FIG. 5 is a flowchart of an example process for utilizing models to detect dangerous tracks for vehicles.

FIG. 5 is a flowchart of an example process 500 for utilizing models to detect dangerous tracks for vehicles. In some implementations, one or more process blocks of FIG. 5 may be performed by a device (e.g., the track detection system 110). In some implementations, one or more process blocks of FIG. 5 may be performed by another device or a group of devices separate from or including the device, such as a vehicle device (e.g., the vehicle device 105). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving, from a vehicle, accelerometer data and video data classified as identifying a risk of a collision or a collision between the vehicle and one or more objects (block 510). For example, the device may receive, from a vehicle, accelerometer data and video data classified as identifying a risk of a collision or a collision between the vehicle and one or more objects, as described above.

As further shown in FIG. 5, process 500 may include identifying, based on the video data and using an object detection model, one or more bounding boxes and object classes for the one or more objects (block 520). For example, the device may identify, based on the video data and using an object detection model, one or more bounding boxes and object classes for the one or more objects, as described above. In some implementations, each of the one or more bounding boxes is associated with a set of coordinates.

As further shown in FIG. 5, process 500 may include identifying, based on the video data and using a tracking model, tracks for the one or more objects (block 530). For example, the device may identify, based on the video data and using a tracking model, tracks for the one or more objects, as described above. In some implementations, identifying, based on the video data and using the tracking model, the tracks for the one or more objects includes determining sets of bounding boxes for each frame of the video data that includes the one or more objects, and identifying the tracks for the one or more objects based on the sets of bounding boxes.

As further shown in FIG. 5, process 500 may include utilizing, based on the object classes, the tracking model to filter out tracks that are not associated with vehicles or vulnerable road users and to generate one or more tracks or an indication of no tracks (block 540). For example, the device may utilize, based on the object classes, the tracking model to filter out tracks that are not associated with vehicles or vulnerable road users and to generate one or more tracks or an indication of no tracks, as described above. In some implementations, utilizing, based on the object classes, the tracking model to filter out tracks that are not associated with vehicles or vulnerable road users and to generate the one or more tracks or the indication of no tracks includes one of filtering out, based on the object classes, a portion of the tracks to generate the one or more tracks from a remaining portion of the tracks; or filtering out, based on the object classes, all of the tracks to generate the indication of no tracks.

As further shown in FIG. 5, process 500 may include generating, via the tracking model and based on the one or more tracks, a collision cone identifying a drivable area of the vehicle to identify objects more likely to be involved in the collision (block 550). For example, the device may generate, via the tracking model and based on the one or more tracks, a collision cone identifying a drivable area of the vehicle to identify objects more likely to be involved in the collision, as described above.

As further shown in FIG. 5, process 500 may include filtering out, using the tracking model, tracks from the one or more tracks, based on areas and aspect ratios of the one or more bounding boxes, and to generate a subset of tracks or another indication of no tracks (block 560). For example, the device may filter out, using the tracking model, tracks from the one or more tracks, based on areas and aspect ratios of the one or more bounding boxes, and to generate a subset of tracks or another indication of no tracks, as described above. In some implementations, filtering out, using the tracking model, the tracks from the one or more tracks, based on the areas and the aspect ratios of the one or more bounding boxes, and to generate the subset of tracks or the other indication of no tracks includes one of filtering out, based on the areas and the aspect ratios of the one or more bounding boxes, a portion of the one or more tracks to generate the subset of tracks from a remaining portion of the one or more tracks; or filtering out, based on the areas and the aspect ratios of the one or more bounding boxes, all of the one or more tracks to generate the other indication of no tracks.

In some implementations, filtering out, using the tracking model, the tracks from the one or more tracks, based on the areas and the aspect ratios of the one or more bounding boxes, and to generate the subset of tracks or the other indication of no tracks includes one or more of filtering out, from the one or more tracks, tracks associated with bounding box areas less than a first percentage of frame areas; filtering out, from the one or more tracks, tracks associated with bounding box areas greater than a second percentage of frame areas; or filtering out, from the one or more tracks, tracks associated with medians of bounding box areas greater than a third percentage of frame areas and with medians of bounding box aspect ratios greater than a particular value.

In some implementations, filtering out, using the tracking model, the tracks from the one or more tracks, based on the areas and the aspect ratios of the one or more bounding boxes, and to generate the subset of tracks or the other indication of no tracks, includes one of filtering out, from the one or more tracks, tracks associated with bounding boxes that fail to intersect with the collision cone, or filtering out, from the one or more tracks, tracks associated with bounding box areas less than a percentage of frame areas.

As further shown in FIG. 5, process 500 may include determining, based on the subset of tracks, the one or more bounding boxes, the collision cone, and the accelerometer data, and using the tracking model, scores for the subset of tracks (block 570). For example, the device may determine, based on the subset of tracks, the one or more bounding boxes, the collision cone, and the accelerometer data, and using the tracking model, scores for the subset of tracks, as described above. In some implementations, determining, based on the subset of tracks, the one or more bounding boxes, the collision cone, and the accelerometer data, and using the tracking model, the scores for the subset of tracks includes calculating a first score for each track of the subset of tracks based on a first time to contact associated with each track, a first border distance from a bounding box of each track to a border of a video frame, and a first center distance from a center of the bounding box of each track and a center of the video frame; calculating a second score for each track of the subset of tracks based on a second time to contact associated with each track, a second border distance from the bounding box of each track to the border of the video frame, and a second center distance from the center of the bounding box of each track and the center of the video frame; calculating a third score based on a time that the bounding box for each track is located in the collision cone and a time that the bounding box for each track is present in the video data; and calculating a score for each track based on the first score, the second score, and the third score.

As further shown in FIG. 5, process 500 may include identifying a track of the subset of tracks with a highest score (block 580). For example, the device may identify a track of the subset of tracks with a highest score, as described above.

As further shown in FIG. 5, process 500 may include performing one or more actions based on the identified track with the highest score (block 590). For example, the device may perform one or more actions based on the identified track with the highest score, as described above. In some implementations, performing the one or more actions includes one or more of providing, for display, data identifying the identified track with the highest score; causing a classifier model that classified the video data as identifying the risk of the collision or the collision to be modified based on the identified track with the highest score; or providing, to an emergency service, data identifying one of the one or more objects associated with the identified track with the highest score.

In some implementations, performing the one or more actions includes one or more of retraining one or more of the object detection model or the tracking model based on the identified track with the highest score, or providing, to an insurance service, data identifying one of the one or more objects associated with the identified track with the highest score.

In some implementations, process 500 includes identifying a possible mistake with a classification of the video data based on the indication of no tracks being generated or based on the other indication of no tracks being generated.

In some implementations, process 500 includes calculating, based on the video data and using the tracking model, times to contact for the one or more objects to collide with the vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    utilizing, by a device, a model to filter out a portion of tracks to generate a set of tracks or an indication of no tracks;
    generating, by the device, via the model, and based on the set of tracks, a collision cone;
    filtering out, by the device and using the model, one or more tracks from the set of tracks, based on areas and aspect ratios of one or more bounding boxes, and to generate a subset of tracks or another indication of no tracks;
    identifying, by the device, a track of the subset of tracks; and
    performing, by the device, one or more actions based on the identified track,
    wherein each track in the portion of tracks comprises a set of bounding boxes for every frame of video data that contains a particular object.

2. The method of claim 1, wherein utilizing the model to filter out the portion of tracks comprises:
    filtering out tracks that are not associated with vehicles or vulnerable road users.

3. The method of claim 1, wherein utilizing the model to filter out the portion of tracks comprises:
    filtering out all tracks to generate the indication of no tracks.

4. The method of claim 1, further comprising:
    identifying possible mistakes based on the indication of no tracks.

5. The method of claim 1, wherein the collision cone includes an area of interest that represents a drivable area ahead.

6. The method of claim 1, wherein identifying the track comprises:
    identifying the track based a calculated weighted score.

7. The method of claim 1, wherein the filtering out further comprises:
    filtering out tracks whose bounding box area is less than a first threshold amount; and
    filtering out tracks whose bounding box area is greater than a second threshold amount, the second threshold amount larger than the first threshold amount.

8. A device, comprising:
    one or more processors configured to:
        utilize a model to filter out a portion of tracks to generate a set of tracks or an indication of no tracks;
        generate via the model, and based on the set of tracks, a collision cone;
        filter out, using the model, one or more tracks from the set of tracks, based on areas and aspect ratios of one or more bounding boxes, and to generate a subset of tracks or another indication of no tracks;
        identify a track of the subset of tracks; and
        perform one or more actions based on the identified track,
        wherein each track in the portion of tracks comprises a set of bounding boxes for every frame of video data that contains a particular object.

9. The device of claim 8, wherein the one or more processors, to utilize the model to filter out the portion of tracks, are configured to:
    filter out tracks that are not associated with vehicles or vulnerable road users.

10. The device of claim 8, wherein the one or more processors, to utilize the model to filter out the portion of tracks, are configured to:
    filter out all tracks to generate the indication of no tracks.

11. The device of claim 8, wherein the one or more processors are further configured to:
    identify possible mistakes based on the indication of no tracks.

12. The device of claim 8, wherein the collision cone includes an area of interest that represents a drivable area ahead.

13. The device of claim 8, wherein the one or more processors, to identify the track, are configured to:
  identify the track based a calculated weighted score.

14. The device of claim 8, wherein the one or more processors are further configured to:
  filter out tracks whose bounding box area is less than a first threshold amount; and
  filter out tracks whose bounding box area is greater than a second threshold amount, the second threshold amount larger than the first threshold amount.

15. A non-transitory computer-readable medium storing a set of instructions, the set of instructions comprising:
  one or more instructions that, when executed by one or more processors of a device, cause the device to:
    utilize a model to filter out a portion of tracks to generate a set of tracks or an indication of no tracks;
    generate via the model, and based on the set of tracks, a collision cone;
    filter out, using the model, one or more tracks from the set of tracks, based on areas and aspect ratios of one or more bounding boxes, and to generate a subset of tracks or another indication of no tracks;
    identify a track of the subset of tracks; and
    perform one or more actions based on the identified track,
  wherein each track in the portion of tracks comprises a set of bounding boxes for every frame of video data that contains a particular object.

16. The non-transitory computer-readable medium of claim 15, wherein the one or more instructions, that cause the device to utilize the model to filter out the portion of tracks, cause the device to:
  filter out tracks that are not associated with vehicles or vulnerable road users.

17. The non-transitory computer-readable medium of claim 15, wherein the one or more instructions, that cause the device to utilize the model to filter out the portion of tracks, cause the device to:
  filter out all tracks to generate the indication of no tracks.

18. The non-transitory computer-readable medium of claim 15, wherein the one or more instructions further cause the device to:
  identify possible mistakes based on the indication of no tracks.

19. The non-transitory computer-readable medium of claim 15, wherein the collision cone includes an area of interest that represents a drivable area ahead.

20. The non-transitory computer-readable medium of claim 15, wherein the one or more instructions further cause the device to:
  filter out tracks whose bounding box area is less than a first threshold amount; and
  filter out tracks whose bounding box area is greater than a second threshold amount, the second threshold amount larger than the first threshold amount.

\* \* \* \* \*